(12) United States Patent
Lee et al.

(10) Patent No.: US 12,363,607 B2
(45) Date of Patent: Jul. 15, 2025

(54) METHOD AND DEVICE FOR CONTROLLING COMMUNICATION PATH OF DUAL SUBSCRIBER IDENTIFICATION MODULE ACCORDING TO CALL

(71) Applicant: Samsung Electronics Co., Ltd., Suwon-si (KR)

(72) Inventors: Kiyong Lee, Suwon-si (KR); Juho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 913 days.

(21) Appl. No.: 17/793,572

(22) PCT Filed: Aug. 8, 2019

(86) PCT No.: PCT/KR2019/009996
§ 371 (c)(1),
(2) Date: Jul. 18, 2022

(87) PCT Pub. No.: WO2020/060029
PCT Pub. Date: Mar. 26, 2020

(65) Prior Publication Data
US 2023/0052857 A1 Feb. 16, 2023

(30) Foreign Application Priority Data
Sep. 17, 2018 (KR) .................. 10-2018-0110949

(51) Int. Cl.
*H04W 40/12* (2009.01)
*H04W 8/18* (2009.01)
*H04W 88/06* (2009.01)

(52) U.S. Cl.
CPC .......... *H04W 40/12* (2013.01); *H04W 8/183* (2013.01); *H04W 88/06* (2013.01)

(58) Field of Classification Search
CPC ..... H04W 40/12; H04W 8/183; H04W 88/06; H04W 24/02
See application file for complete search history.

(56) References Cited

U.S. PATENT DOCUMENTS

| 2011/0223866 A1* | 9/2011 | Cho ....................... H04M 1/724 |
| | | 455/41.3 |
| 2012/0135715 A1* | 5/2012 | Kang ....................... H04W 4/16 |
| | | 455/418 |

(Continued)

FOREIGN PATENT DOCUMENTS

| KR | 10-2010-0131299 A | 12/2010 |
| KR | 10-2018-0016250 A | 2/2018 |

(Continued)

OTHER PUBLICATIONS

Korean Office Action dated May 24, 2024, issued in Korean Patent Application No. 10-2018-0110949.

*Primary Examiner* — Rina C Pancholi
(74) *Attorney, Agent, or Firm* — Jefferson IP Law, LLP

(57) ABSTRACT

Various embodiments of the present invention provide a method and device, the device comprising: a first subscriber identification module; a second subscriber identification module; a communication module; and a processor, wherein the processor is configured to receive a call request using the first subscriber identification module, change a communication path of the second subscriber identification module, and connect the call request using the first subscriber identification module by using the communication module. Various embodiments are possible.

9 Claims, 9 Drawing Sheets

(56) References Cited

U.S. PATENT DOCUMENTS

| | | | |
|---|---|---|---|
| 2012/0178500 A1* | 7/2012 | Hwang | H04W 8/183 |
| | | | 455/558 |
| 2013/0217373 A1 | 8/2013 | Baek | |
| 2014/0274006 A1* | 9/2014 | Mutya | H04W 4/16 |
| | | | 455/416 |
| 2016/0014579 A1* | 1/2016 | Kasilya Sudarsan | |
| | | | H04W 76/15 |
| | | | 455/553.1 |
| 2016/0149605 A1 | 5/2016 | Vecera et al. | |
| 2017/0195929 A1 | 7/2017 | Li | |
| 2018/0042054 A1 | 2/2018 | Han | |

FOREIGN PATENT DOCUMENTS

| | | | |
|---|---|---|---|
| KR | 10-2018-0062997 A | 6/2018 | |
| WO | 2017/143609 A1 | 8/2017 | |

\* cited by examiner

METHOD AND DEVICE FOR CONTROLLING COMMUNICATION PATH OF DUAL SUBSCRIBER IDENTIFICATION MODULE ACCORDING TO CALL

TECHNICAL FIELD

The disclosure provides a method and a device for controlling a dual subscriber identification module (SIM) communication path according to a call.

BACKGROUND ART

With the development of digital technologies, various types of electronic devices have become widely used, such as a mobile communication terminal, a personal digital assistant (PDA), an electronic note, a smartphone, a tablet personal computer (PC), and a wearable device. To support and increase functions, such electronic devices have continuously evolved in terms of hardware and/or software.

For example, the electronic devices provide a function of using two phone numbers through two subscriber identification modules (SIMs). That is, a dual SIM electronic device may use two phone numbers and two network services with one electronic device. When originating a call or sending a text message, the dual SIM electronic device may receive a selection of a SIM to use from a user, and originate a call or send a text message through a communication network associated with the selected SIM. Such dual SIM electronic device may be divided into a dual SIM dual standby (DSDS) type and a dual SIM dual active (DSDA) type.

The DSDS-type electronic device includes a communication module, and while one of two SIMs is used, the other SIM cannot be used. However, the DSDA-type electronic device includes two communication modules, and even though one of two SIMs is used, another SIM can be used. For example, in the DSDS type, while a call is made using a first SIM, not only a call using a second SIM but also a text message reception or transmission is not allowed, and data communication is not allowed. In the DSDA type, while call is made using a first SIM, not only a call using a second SIM but also using a text message function or data is allowed, but there is a problem that the amount of battery consumption is large.

DISCLOSURE OF INVENTION

Technical Problem

In generation, a DSDS-type voice over long-term evolution (VoLTE) service may operate for only one of two SIMs according to default data subscription (DDS). However, a DSDS-type electronic device may determine whether a network state of a second SIM corresponds to communication forward on not reachable (CFNRc) or communication forwarding no reply (CFNR) while a call is made through a first SIM, and apply a call forwarding function to allow call reception through the second SIM. For example, the electronic device may apply call forward to both SIMs in an idle state, and allow a communication service to be provided through the other SIM while one SIM is being used.

However, the conventional call forwarding function allows call reception through the second SIM, but does not allow call transmission through the second SIM. In addition, to enable call reception through the second SIM, the electronic device checks a network state of the second SIM through CFNRc or CFNR, and allows receiving a call of the second SIM after a predetermined time interval through the first SIM that is being used for a call, and thus a predetermined time interval of a delay may occur until call reception. In addition, the electronic device needs to forward call reception of the first SIM to a phone number of the second SIM, and forward call reception of the second SIM to a phone number of the first SIM, and thus there is a problem that enabling call forwarding needs to be performed twice.

In various embodiments may provide a method and a device for registering, when call origination is performed using a first SIM by an electronic device including dual SIMs, second SIM information in an IMS server through a first communication path of the first SIM, and then connecting the call origination of the first SIM, so as to enable call reception or origination through the second SIM.

Solution to Problem

An electronic device according to various embodiments of the disclosure may include a first subscriber identification module (SIM), a second SIM, a communication module, and a processor, wherein the processor is configured to receive a call request using the first SIM, change a communication path for the second SIM, and connect the call request using the first SIM by using the communication module.

An operation method of an electronic device including dual SIMs according to various embodiments of the disclosure may include receiving a call request using a first SIM, changing a commutation path for a second SIM, and connecting the call request using the first SIM.

Advantageous Effects of Invention

According to various embodiments, when an electronic device including dual SIMs originates a call by using a first SIM, information on a second SIM is registered in an IMS server through a first communication path of a first SIM, and then call origination of the first SIM is connected, whereby call reception or origination through the second SIM can be performed.

According to various embodiments, an electronic device including dual SIMs identifies network states of two SIMs in real time, and configures, when the network state of one SIM is not good, communication paths of both SIMs as another communication path, thereby controlling a seamless communication service to be provided through both SIMs.

According to various embodiments, when a first SIM of an electronic device including dual SIMs is out of a service area, enters a busy area, or is in a weak electric field situation, a first communication path of the first SIM is changed to a second communication path of a second SIM, whereby battery consumption can be reduced through minimization of an operation of searching for a network by a communication module.

According to various embodiments, a DSDS-type electronic device variably configures a communication path according to a network state, thereby providing communication services to both SIMs according to a DSDA type.

MODE FOR THE INVENTION

Figure 1:
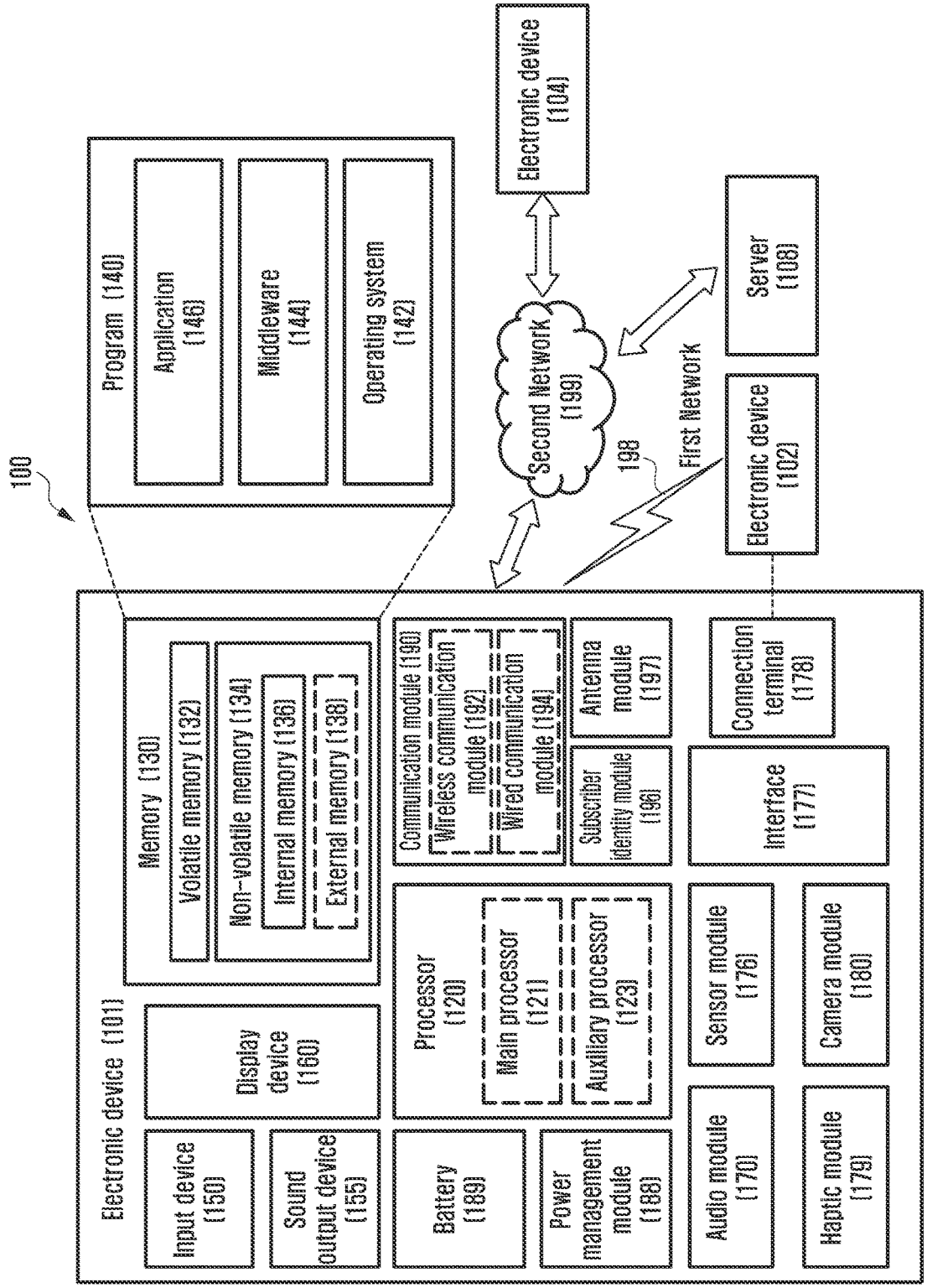
FIG. 1 is a block diagram illustrating an electronic device 101 in a network environment 100 according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a conductor formed on a substrate (e.g., a PCB) or a radiator formed of a conductive pattern. According to an embodiment, the antenna module 197 may include a plurality of antennas. In this case, at least one antenna appropriate for a communication scheme used in a communication network such as the first network 198 or the second network 199, for example, by the communication module 190 can be selected from the plurality of antennas. A signal or power may be transmitted or received between the communication module 190 and an external electronic device through the selected at least one antenna. According to some embodiments, other components (e.g., RFIC) other than the radiator may be additionally formed as a part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 101 of FIG. 1) to be described below may be a device including dual SIMs in the manner of dual SIM dual standby (DSDS). That is, the electronic device 101 may include at least two SIMs, and a communication module (e.g., the communication module 190 of FIG. 1). For convenience of description, the electronic device 101 including two SIMs is described as an example, but the electronic device may operate in the similar manner even when the electronic device includes two or more SIMs (e.g., triple SIM triple standby (TSTS) or multi SIM multi standby (MSMS). In addition, the electronic device 101 may be a device which can provide a voice over long-term evolution (VoLTE) service.

Figure 2A:
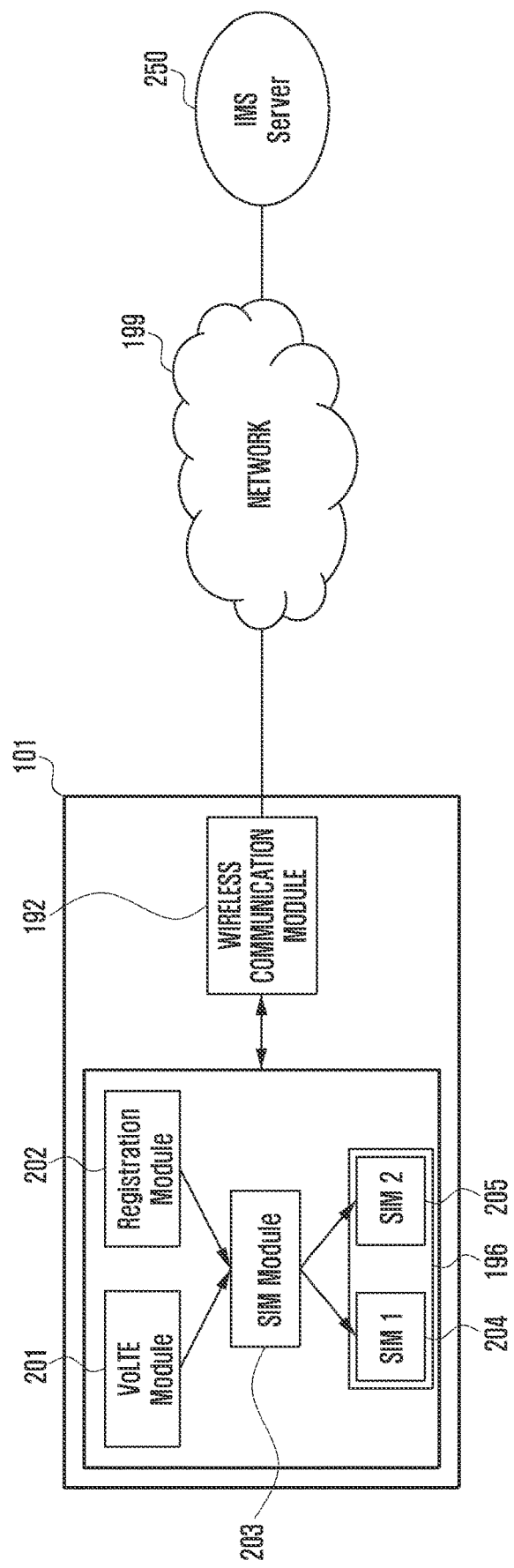
FIG. 2A illustrate a structure of a DSDS-type electronic device according to various embodiment.

FIG. 2A illustrates a structure of a DSDS-type electronic device according to various embodiments.

Referring to FIG. 2A, an electronic device (e.g., the electronic device 101 of FIG. 1) according to various embodiments may include a VoLTE module 201, a registration module 202, a SIM module 203, SIM 1 204, SIM 2 205, a wireless communication module 192. SIM 1 204 and SIM 2 205 may be included in the subscriber identification module 196 of FIG. 1. The modules included in the electronic device 101 may include modules implemented in hardware, software, or firmware. The VoLTE module 201 may be a module for controlling a voice call or a video call. The registration module 202 may be a module for registering, in the IMS server 250, information on a subscriber identification module (SIM) card mounted in the electronic device 101 and information (or subscriber information) on a SIM (an embedded SIM (eSIM)) installed in the electronic device. The SIM information may include first SIM information (or first subscriber information) corresponding to SIM 1 204 and second SIM information (or second subscriber information) corresponding to SIM 2 205.

According to various embodiments, a SIM may be mounted in the electronic device 101 in the form of a card (e.g., SIM1 204 and SIM 2 205), and may be also implemented as an eSIM mounted in the electronic device 101 so as to install or store a profile. The electronic device 101 may include an eSIM which can be installed by downloading the profile. Hereinafter, FIG. 2A illustrates an example in which a SIM is mounted in the electronic device 101 in the form of a card, but the disclosure is not limited thereto.

According to various embodiments, SIM information may include a unique number allocated to a SIM. For example, an integrated circuit card identifier (ICCID) corresponding to the fixed number and/or an international mobile subscriber identity (IMSI) which changes for each a subscriber line. For example, the SIM information may further include at least one of information such as an authentication key, a local area identity (LAI), an operator-specific emergency phone number, a short message service center (SMSC) number, a service provider name (SPN), service dialing numbers (SDN), an add-of-charge (VAS) parameter, and a value-added service (VAS) application program.

According to various embodiment, an Internet protocol (IP) multimedia subsystem (IMS) server 250 may provide a multimedia service such as a voice, audio, a video, and data, based on an Internet protocol (IP). The IMS server 250 may receive the first SIM information and the second SIM information from the electronic device 101 through a network (e.g., the second network 199 of FIG. 1), and provide the multimedia service, based on the received first SIM information and second SIM information. For example, the IMS server 250 may include a call state control function (CSCF) for processing a call and a session, a home subscriber server (HSS) for managing subscriber information required for session control and service control, a subscription locator function (SLF), a multimedia resource function processor (MRFP) for generating and processing a multistream such as a voice and a video, a multimedia resource function controller (MRFC) for transmitting or receiving a session initiation protocol (SIP) message to or from another server in the IMS to control the MRFP, a server for providing an application server, and a server (e.g., a policy and charging rules function (PCRF) and a policy and changing enforcement function (PCEF)) for performing QoS control.

Figure 2B:
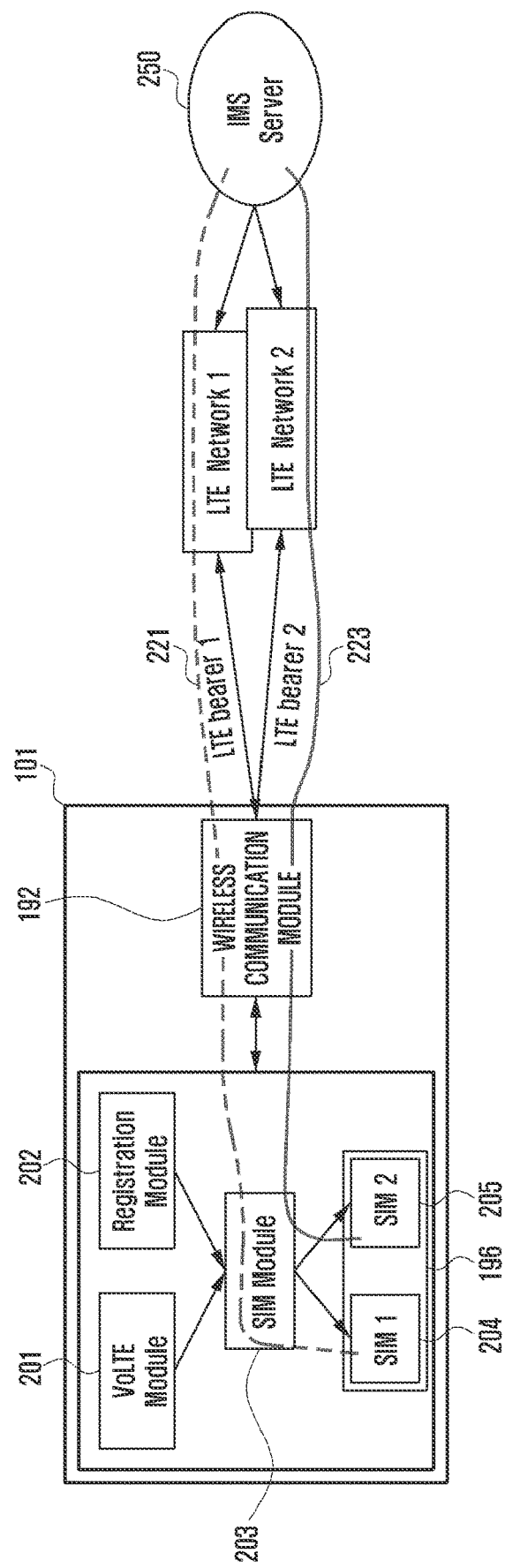
FIG. 2B illustrates an example of configuring a communication path by a DSDS-type electronic device according to various embodiments.

FIG. 2B illustrates an example of configuring a communication path by a DSDS-type electronic device according to various embodiments.

Referring to FIG. 2B, an electronic device (e.g., the electronic device 101 of FIG. 1) may read SIM information included in SIM 1 204 and SIM 2 205 by using a SIM module 203, and register the read SIM information in an IMS server 250 through a wireless communication module 192. In this case, the wireless communication module 192 may transmit first SIM information corresponding to SIM 1 204 to the IMS server 250 through LTE bearer 1 221 (e.g., a first communication path), and transmit second SIM information corresponding to SIM 2 205 to the IMS server 250 through LTE bearer 2 223 (e.g., a second communication path). When the electronic device 101 is turned on, the electronic device 101 may perform a process for configuring a communication path of a SIM mounted in each of SIM 1 204 and SIM 2 205.

According to various embodiments, the IMS server 250 may provide a communication service according to a communication path through which the SIM information is registered. For example, the IMS server 250 may provide a communication service to a first SIM through LTE bearer 1 221, and provide a communication service to a second SIM through LTE bearer 2 223 (e.g., FIG. 2B). For example, during communication using the first SIM, the communication service is provided through LTE bearer 1 221 only, and during communication using the second SIM, the communication service is provided through LTE bearer 2 223 only. The first SIM and the second SIM may different networks (e.g., LTE network 1 and LTE network 2) through which the communication service is provided. For example, LTE bearer 1 221 may be formed through LTE network 1, and LTE bearer 2 223 may be formed through LTE network 2.

According to various embodiments, the DSDS-type electronic device 101 may use simultaneously use two phone numbers with one device. For example, when there is communication service limit through the first SIM, the electronic device 101 may be provided with the communication service through the second SIM. Providers of the communication service provided through the first SIM and the second SIM may be identical or different. For example, LTE network 1 may be a first communication network provided by a first carrier, and LTE network 2 may be a second communication network provided by a second carrier. While a call (e.g., VoLTE) is made using the first SIM, the communication service using the second SIM may be restricted. For example, while a call is made using the first SIM, the wireless communication module 192 may provide the communication service through LTE bearer 1 221, and may fail to provide the communication service through LTE bearer 2 223. While a call is made using the first SIM, the wireless communication module 192 may only perform call reception when the communication service through LTE bearer 2 223 is provided, but a delay may occur until receiving a call.

Figure 2C:
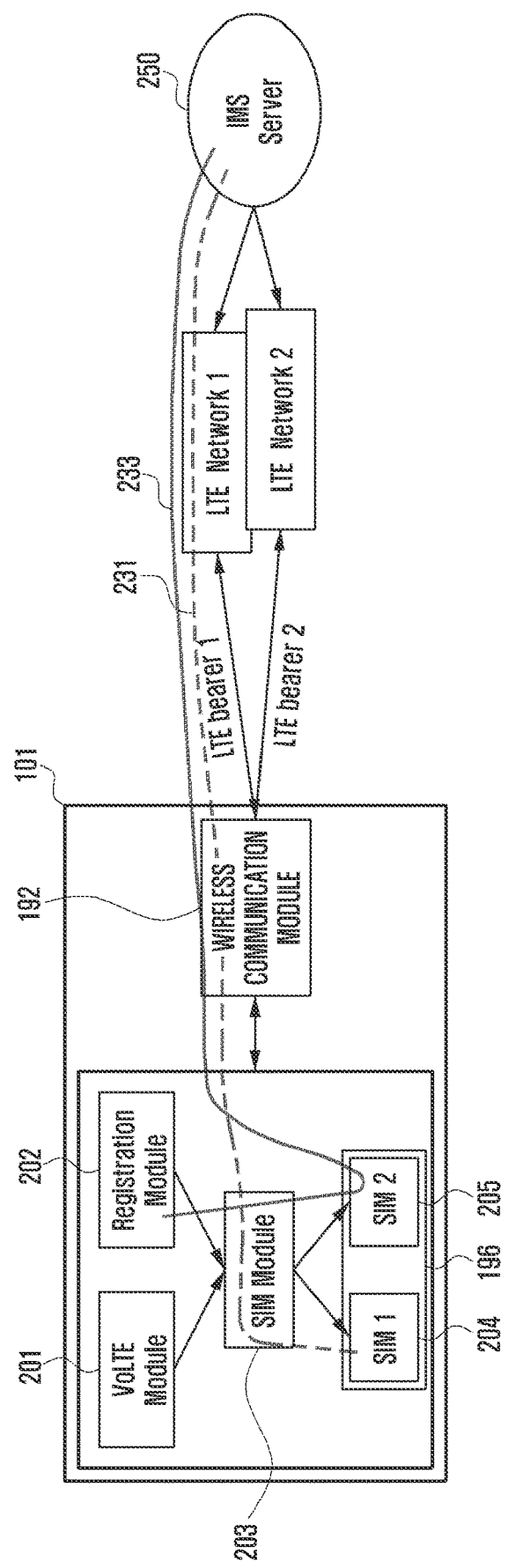
FIG. 2C illustrates an example of changing a communication path by a DSDS-type electronic device according to various embodiments.

FIG. 2C illustrates an example of changing a communication path by a DSDS-type electronic device according to various embodiments.

Referring to FIG. 2C, an electronic device (e.g., the electronic device 101 of FIG. 1) may control second SIM information of a second SIM mounted in SIM 2 205 to be registered in an IMS server 250 through LTE bearer 1 221 by using a registration module 202 when there is a call request using a first SIM mounted in SIM 1 204. According to various embodiments, the electronic device 101 may suspend the call request for a while to change a communication path of the second SIM when the call request (e.g., outgoing or incoming call) using the first SIM is received. The wireless communication module 192 may change the communication path 223 of the second SIM from LTE bearer 2 223 to LTE bearer 1 221. That is, before the call request using the first SIM is received, the communication path 223 of the second SIM may be configured as LTE bearer 2 223, and after the call request using the first SIM is received, the communication path 233 of the second SIM may be configured as LTE bearer 1 221. That is, before the call request using the first SIM is received, the communication path 233 of the second SIM may be configured as LTE bearer 2 223, and after the call request using the first SIM is received, the communication path 233 of the second SIM may be configured as LTE bearer 1 223. After changing the communication path 233 of the second SIM, the wireless communication module 192 may connect the call request using the first SIM through LTE bearer 1 221. During the call connection using the first SIM, the communication path 231 of the first SIM and the communication path 233 of the second SIM may be configured as LTE bearer 1 221. The IMS server 250 may provide a communication service according to a communication path through which SIM information is registered. For example, the IMS server 250 may provide the communication service to the first SIM and the second SIM through LTE bearer 1 221.

According to various embodiments, when the call connection using the first SIM ends, the electronic device 101 may change the communication path of the second SIM, based on a configuration of the electronic device or a user selection. For example, when the call connection using the first SIM ends, the electronic device 101 may maintain the communication path 231 of the first SIM as LTE bearer 1 221, and change the communication path of the second SIM to LTE bearer 2 223 upon control by the registration module 202 (see FIG. 2B). Alternatively, even though the call connection using the first SIM ends, the electronic device 101 may maintain the communication path 231 of the first SIM and the communication path 233 of the second SIM as LTE bearer 1 221. The electronic device 101 according to various embodiments may change the communication path 231 of the first SIM and the communication path 233 of the second SIM to LTE bearer 2 223 when there is a call request using the second SIM. The electronic device 101 according to various embodiments may variably configure a communication path according to a current network state so as to reduce battery consumption by minimizing an operation of attempting to search for a network by a communication module (e.g., the wireless communication module 192).

Figure 3:
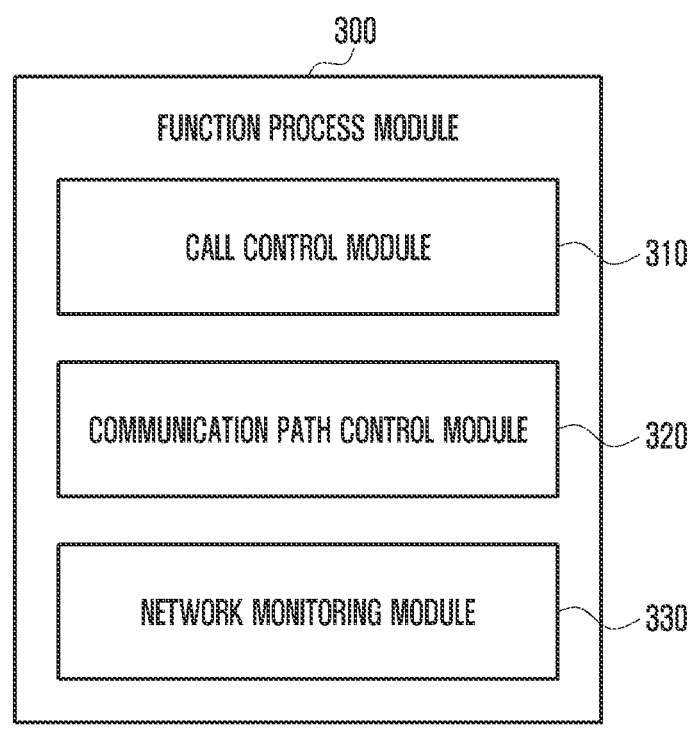
FIG. 3 illustrates an example of a functional process module of an electronic device according to various embodiments.

FIG. 3 illustrates an example of a function process module of an electronic device according to various embodiments.

Referring to FIG. 3, a function process module 300 may be included, as a hardware module or a software module, in a processor (e.g., the processor 120 of FIG. 1) including processing circuitry. The function process module 300 may include a call control module 310, a communication path control module 320, and a network monitoring module 330.

According to various embodiments, the call control module 310 (e.g., a VoLTE module 201 of FIGS. 2A, 2B and/or 2C) may control a call of an electronic device (e.g., the electronic device 101 of FIG. 1). The call may include a voice call or a video call. The call control module 310 may control a call to be made using one of a first SIM (e.g., SIM 1 204 of FIGS. 2A, 2B and/or 2C) and a second SIM (e.g., SIM 2 205 of FIGS. 2A, 2B and/or 2C) of the electronic device 101. For example, the control module 310 may receive a selection of a SIM to originate a call, from a user of the electronic device 101, and control call origination by using the selected SIM. When the call origination using the first SIM is requested, the call control module 310 may transfer the request to the communication path control module 320.

According to various embodiments, the call control module 310 may transfer the request and suspend (or wait for) the call origination. For example, the call control module 310 may suspend the call origination until receiving a registration (or change) completion message from the communication path control module 320. When receiving the registration completion message from the communication path control module 330, the call control module 310 may connect (or permit) the call origination using the first SIM through the wireless communication module 192. When the connection using the first SIM ends, the call control module 310 according to various embodiments may transfer whether the connection ends to the communication path control path 330.

According to various embodiments, the communication path control module 320 (e.g., the registration module 202 of FIGS. 2A, 2B and/or 2C) may control a communication path for a SIM mounted in an electronic device (e.g., the electronic device 101 of FIG. 1). For example, the communication path control module 320 may configure a communication path of a first SIM (e.g., SIM1 204 of FIGS. 2A, 2B and/or 2C) of the electronic device 101 as a first communication path (e.g., LTE bearer 1 221 of FIGS. 2A, 2B and/or 2C). The communication path control module 320 may configure a communication path of a second SIM (e.g., SIM 2 205 of FIGS. 2A, 2B and/or 2C) of the electronic device 101 as a second communication path (e.g., LTE bearer 2 223 of FIGS. 2A, 2B and/or 2C). The communication call control module 320 may control first SIM information to be registered in an IMS server (e.g., the IMS server 250 of FIGS. 2A, 2B and/or 2C) through the first communication path, and second information to be registered in the IMS server 250 through the second communication path.

According to various embodiments, when receiving a call originating request using the first SIM from the communication control module 310, the communication path control module 320 may register the second SIM information in the IMS server 250 through the first communication path. That is, the communication path control module 320 may configure (or change) the communication path of the second SIM as (or to) the first communication path rather than the second communication path. Once the changing of the communication path of the second SIM is completed, the communication path control module 320 may transfer a registration completion message to the call control module 310. Once the call connection using the first SIM ends, the communication path control module 320 according to various embodiments may change the communication path of the second SIM, based on a configuration of the electronic device 101 or a user selection. For example, once the call connection using the first SIM is completed, the communication path control module 320 may change the communication path of the second SIM from the first communication path to the second communication path.

The communication path control module 320 according to various embodiments may change the communication path corresponding to the first SIM or the second SIM, based on a network state of the communication path corresponding to each of the first SIM and the second SIM. The communication path control module 320 may receive a network state from the network monitoring module 330. For example, when the network state corresponds to a configured condition, the communication path control module 320 may change the communication path corresponding to the first SIM or the second SIM. The configured condition may include at least one of a no service situation, a busy situation, or a weak electric field situation. The no service situation may include a state in which a network is not connected and a communication service cannot be provided. The busy situation may include a case in which a reception power level (Rx power level) of the electronic device 101 is equal to or less than a reference value. The weak electric field situation may include a case in which a signal to noise ratio (SNR) of the electronic device 101 is equal to or less than a reference value.

When the network state of the first communication path corresponds to a configured condition, the communication path control module 320 according to various embodiments may change the communication path of the first SIM to the second communication path of the second SIM. Alternatively, when the network state of the second communication path corresponds to a configured condition, the communication path control module 320 may change the communication path of the second SIM to the first communication path of the first SIM. When the network state of the first communication path corresponds to the configured condition while the communication path of each of the first SIM and the second SIM is configured as the first communication path, the communication path control module 320 according to various embodiments may change the communication path of each of the first SIM and the second SIM to the second communication path. When the network state of the second communication path corresponds to the configured condition while the communication path of each of the first SIM and the second SIM is configured as the second communication path, the communication path control module 320 may change the communication path of each of the first SIM and the second SIM to the first communication path.

According to various embodiments, the network monitoring module 330 may monitor a network state of each of the first communication path and the second communication path. For example, the network monitoring module 330 may monitor whether the network state corresponding to the first communication path corresponds to the configured condition. The network monitoring module 330 may monitor whether the network state corresponding to the second communication path corresponds to a configured condition. Alternatively, the network monitoring module 330 may monitor whether a call connection using the first communication path or the second communication path ends. Alternatively, while the communication path of each of the first SIM and the second SIM is configured as a communication path (e.g., the first communication path), the network monitoring module 330 may monitor whether the network state corresponding to another communication path (e.g., the second communication path) is changed. Alternatively, while the communication path of each of the first SIM and the second SIM is configured as the first communication path, the network monitoring module 330 may monitor at least one of a network state corresponding to the first communication path, a network state corresponding to the second communication path, or a network state corresponding to each of the first and second communication paths.

An electronic device (e.g., the electronic device 101 of FIG. 1) according to various embodiments of the disclosure may include a first SIM (e.g., SIM 1 204 of FIGS. 2A, 2B and/or 2C), a second SIM (e.g., SIM 2 205 of FIGS. 2A, 2B and/or 2C), a communication module (e.g., the wireless communication module 192 of FIG. 1), and a processor (e.g., the processor 120 of FIG. 1), wherein the processor is configured to receive a call request using the first SIM, change a communication path for the second SIM, and connect the call request using the first SIM by using the communication module.

The processor may be configured to configure a communication path of the first SIM as a first communication path and configure a communication path of the second SIM as a second communication path before the call request is received.

The processor may be configured to change the communication path of the second SIM to the first communication path after the call request is received.

The processor may be configured to change a communication path corresponding to the second SIM, based on a configuration of the electronic device or a user selection when a call connection using the first SIM ends.

The processor may be configured to change the communication path corresponding to the second SIM from a first communication path to a second communication path when the call connection using the first SIM ends.

The processor may be configured to monitor a network state of a communication path corresponding to each of the first SIM and the second SIM, and change the communication path corresponding to the first SIM or the second SIM, based on the network state of the communication path.

The processor may be configured to change the communication path corresponding to the first SIM or the second SIM when the network state corresponds to a configured condition.

The configured condition may include at least one of a no service situation, a busy situation, or a week electric field situation, and the processor may be configured to change the communication path corresponding to the first SIM or the second SIM when the network state of the communication path corresponding to each of the first SIM and the second SIM corresponds to the configured condition.

The processor may be configured to change the communication path of each of the first SIM and the second SIM to a second communication path when the network state of a first communication path corresponds to the configured condition while the communication path of each of the first SIM and the second SIM is configured as the first communication path.

The processor may be configured to change the communication path of each of the first SIM and the second SIM to a first communication path when the network state of a second communication path corresponds to the configured condition while the communication path of each of the first SIM and the second SIM is configured as the second communication path.

The processor may be configured to change the communication path corresponding to the first SIM to a second communication path when the network state of a first communication path corresponds to the configured condition while the communication path of the first SIM is configured as the first communication path and the communication path of the second SIM is configured as the second communication path.

The processor may be configured to change the communication path corresponding to the second SIM to a first communication path when the network state of the second communication path corresponds to the configured condition while the communication path of the first SIM is configured as the first communication path and the communication path of the second SIM is configured as the second communication path.

Figure 4:
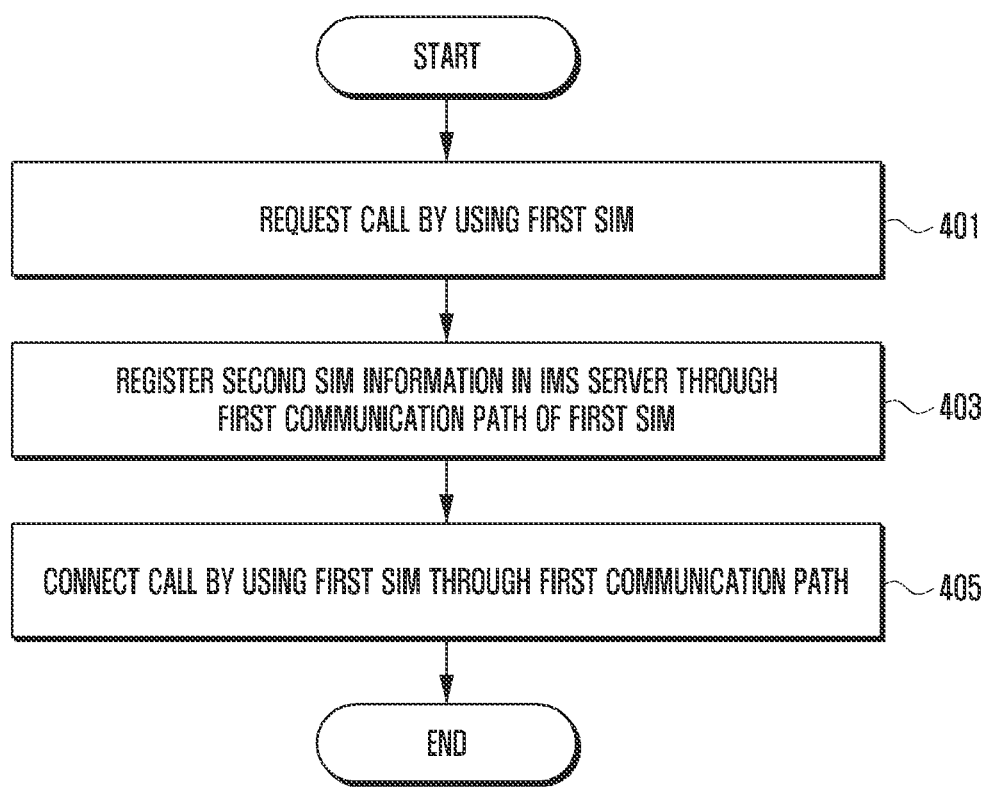
FIG. 4 is a flowchart illustrating an operation method of an electronic device according to various embodiments.

FIG. 4 is a flowchart illustrating an operation method of an electronic device according to various embodiments.

Referring to FIG. 4, in operation 401, a processor (e.g., the processor 120 of FIG. 1) of an electronic device (e.g., the electronic device 101 of FIG. 1) according to various embodiments may receive a call request using a first SIM. The call request may include call origination or call reception. For example, the processor 120 (e.g., the communication control module 310 of FIG. 3) may receive an input of a phone number of a counterpart electronic device (e.g., the electronic device 102 or the electronic device 104 of FIG. 1) from a user, receive a selection of a first SIM, and receive a selection of a dial button, so as to receive the call origination. Alternatively, the processor 120 may receive a request for a call to a phone number of the first SIM, from the counterpart electronic device (e.g., the electronic device 102 or the electronic device 104 of FIG. 1), or vice versa.

According to various embodiments, the processor 120 (e.g., the call control module 310 of FIG. 3) may suspend the call request. Before performing a call connection in response to the call request, the processor 120 may suspend the call request for a while to change a communication path of the second SIM. For example, when the call origination is requested, the processor 120 may stand by instead of transmitting the call origination request to the counterpart electronic device (e.g., the electronic device 102 or the electronic device 104 of FIG. 1). Alternatively, call reception is requested, the processor 120 may stand by instead of notifying a user of the call reception through at least one of a display (e.g., the display device 160 of FIG. 1), a speaker (e.g., the sound output device 155 of FIG. 1), or a vibration (e.g., the haptic module 179 of FIG. 1) of the electronic device 101. According to various embodiments, the processor 120 may register second SIM information in the IMS server through the first communication path of the first SIM while simultaneously receiving the call request. The processor 120 may register the second SIM information in the IMS server through the first communication path of the first SIM during the call request.

According to various embodiments, in operation 403, the processor 120 (e.g., the communication control module 320) may register second SIM information in an IMS server (e.g., the IMS server 250 of FIGS. 2A, 2B and/or 2C) through a first communication path (e.g., LTE bearer 1 221 of FIGS. 2A, 2B and/or 2C) of a first SIM. Before operation 401, the first SIM information may be registered in the IMS server 250 through the first communication path, and the second SIM information may be registered in the IMS server through the second communication path (e.g., LTE bearer 2 223 of FIGS. 2A, 2B and/or 2C). In this case, the IMS server (e.g., the IMS server 250 of FIGS. 2A, 2B and/or 2C) may provide a communication service corresponding to the first SIM through the first communication path, and provide a communication service corresponding to the second SIM through the second communication path.

In an embodiment, while a call using the first SIM is connected, the processor 120 of the DSDS-type electronic device 101 may change the communication path of the second SIM to provide a seamless communication service to the second SIM. The processor 120 may change the communication path of the second SIM from the second communication path to the first communication path. In this case, the IMS server 250 may provide the communication service corresponding to each of the first SIM and the second SIM through the first communication path.

In operation 405, the processor 120 (e.g., the call control module 310 of FIG. 3) may connect the call request using the first SIM through the first communication path. When the call origination is requested, the processor 120 may connect the call origination to the counterpart electronic device (e.g., the electronic device 102 or the electronic device 104 of FIG. 1). Alternatively, when the call reception is requested, the processor 120 may notify the user of the call reception through a display (e.g., the display device 160 of FIG. 1), a speaker (e.g., the sound output device 155 of FIG. 1), or a vibration (e.g., the haptic module 179 of FIG. 1) of the electronic device 101. The IMS server 250 may provide the communication service for each of the first SIM and the second SIM through the first communication path. While the call is connected, the processor 120 may provide the communication service for each of the first SIM and the second SIM through the first communication path.

Figure 5:
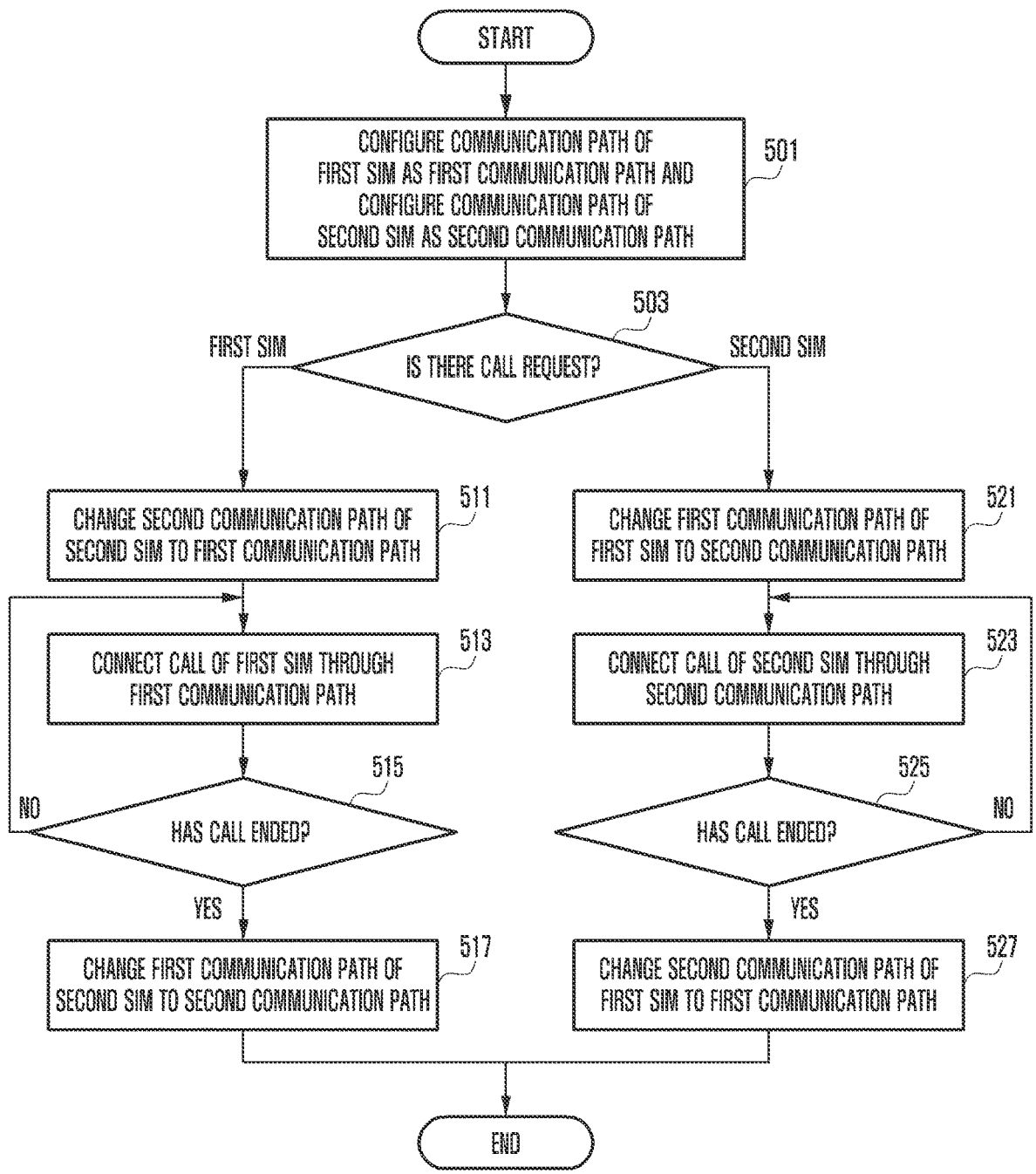
FIG. 5 is a flowchart illustrating a method for controlling a dual SIM communication path according to a call according to various embodiments.

FIG. 5 is a flowchart illustrating a method for controlling a dual SIM communication path according to a call according to various embodiments.

Referring to FIG. 5, in operation 501, a processor (e.g., the processor 120 of FIG. 1) of an electronic device (e.g., the electronic device 101 of FIG. 1) may configure a communion path for each of a first SIM and a second SIM mounted in the electronic device 101. For example, the processor 120 (e.g., the communication path control module 320 of FIG. 3) may configure a communication path of the first SIM as a first communication path (e.g., LTE bearer 1 221 of FIGS. 2A, 2B and/or 2C), and configure a communication path of the second SIM as a second communication path (e.g., LTE bearer 2 223 of FIGS. 2A, 2B and/or 2C).

In operation 503, the processor 120 (e.g., the communication control module 310 of FIG. 3) may determine whether a call is required. The call may include a voice call or a video call. In addition, the call request may include a call origination request or a call reception request. Hereinafter, call origination is described as an example. A user (or a subscriber) may select a SIM to use for call origination from among two SIMs mounted in the electronic device 101 when the call origination is requested. For example, the user may input a phone number of a counterpart electronic device (e.g., the electronic device 102 or the electronic device 104 of FIG. 1), select a SIM to use to originate a call, and select a dial button. The processor 120 may perform operation 511 or operation 521 according to a SIM selected by the user. The processor 120 may perform operation 511 when a first SIM is selected by the user, and perform operation 521 when a second SIM is selected by the user.

In operation 511, the processor 120 (e.g., the communication path control module 320 of FIG. 3) may change the second communication path of the second SIM to the first communication path. The processor 120 may register second SIM information in an IMS server (e.g., the IMS server 250 of FIGS. 2A, 2B and/or 2C) through the first communication path. In this case, the IMS server 250 may provide a communication service corresponding to the second SIM through the first communication path.

In operation 513, the processor 120 (e.g., the call control module 310 of FIG. 3) may connect a call of the first SIM through the first communication path. The processor 120 may transmit a call request to the counterpart electronic device (e.g., the electronic device 102 or the electronic device 104 of FIG. 1) through a communication module (e.g., the wireless communication module 192 of FIG. 1). When the counterpart electronic device permits the call, the electronic device 101 may be connected with the counterpart electronic device. The IMS server 250 may provide the communication service corresponding to each of the first SIM and the second SIM through the first communication path.

In operation 515, the processor 120 (e.g., the call control module 310 of FIG. 3) may determine whether the call ends. If the call with the counterpart electronic device ends (if YES), the processor 120 may perform operation 519. If the call with the counterpart electronic device does not end (if NO), the processor 120 may return to operation 513. The processor 120 according to various embodiments may perform operation 517 based on a configuration of the electronic device or a user selection. The configuration of the electronic device 101 may be a value configured as default, or may change based on the user selection. For example, to provide seamless communication service, the electronic device 101 may be configured, as a default value, to change a communication path after the call ends. After the call ends, the processor 120 may inquire, of the user, whether to change the communication path of the SIM, and may perform operation 517 when the user request changing of the communication path.

In operation 517, the processor 120 (e.g., the communication path control module 320 of FIG. 3) may change (or configure) the first communication path of the second SIM to (or as) the second communication path. While the call is connected, the communication path corresponding to the second SIM may be configured as the first communication path by operation 511. In this case, the IMS server 250 may provide the communication service using the second SIM through the first communication path. According to an embodiment, once the call ends, the processor 120 may change the communication path of the second SIM to the original second communication path. The processor 120 according to various embodiments may maintain the first communication path, instead of changing the communication path of the second SIM, based on the user selection or the configuration of the electronic device 101.

In operation 521, the processor 120 (e.g., the control module 320 of FIG. 3) may change the first communication path of the first SIM to the second communication path. The processor 120 may register first SIM information in the IMS server (e.g., the IMS server 250 of FIGS. 2A, 2B and/or 2C) through the second communication path. In this case, the IMS server 250 may provide a communication service corresponding to the first SIM through the second communication path.

In operation 523, the processor 120 (e.g., the call control module 310 of FIG. 3) may connect a call of the second SIM through the second communication path. The processor 120 may transmit a call request to a counterpart electronic device (e.g., the electronic device 102 or the electronic device 104 of FIG. 1) through a communication module (e.g., the wireless communication module 192 of FIG. 1). When the counterpart electronic device permits the call, the electronic device 101 may be connected with the counterpart electronic device. The IMS server 250 may provide a communication service corresponding to each of the first SIM and the second SIM through the second communication path.

In operation 525, the processor 120 (e.g., the call control module 310 of FIG. 3) may determine whether the call ends. If the call with the counterpart electronic device ends (if YES), the processor 120 may perform operation 527. If the call with the counterpart electronic device does not end (if NO), the processor 120 may return to operation 523. The processor 120 according to various embodiments may perform operation 519 based on the configuration of the electronic device 101 or the user selection.

In operation 527, the processor 120 (e.g., the communication path control module 320 of FIG. 3) may configure the second communication path of the first SIM as the first communication path. While the call is connected, the communication path corresponding to the first SIM may be configured as the second communication path by operation 523. In this case, the IMS server 250 may provide a communication service using the first SIM through the second communication path. According to an embodiment, once the call ends, the processor 120 may change the communication path of the first SIM to the original first communication path. The processor 120 according to various embodiments may maintain the second communication path, instead of changing the communication path of the first SIM, based on the user selection or the configuration of the electronic device 101.

Figure 6:
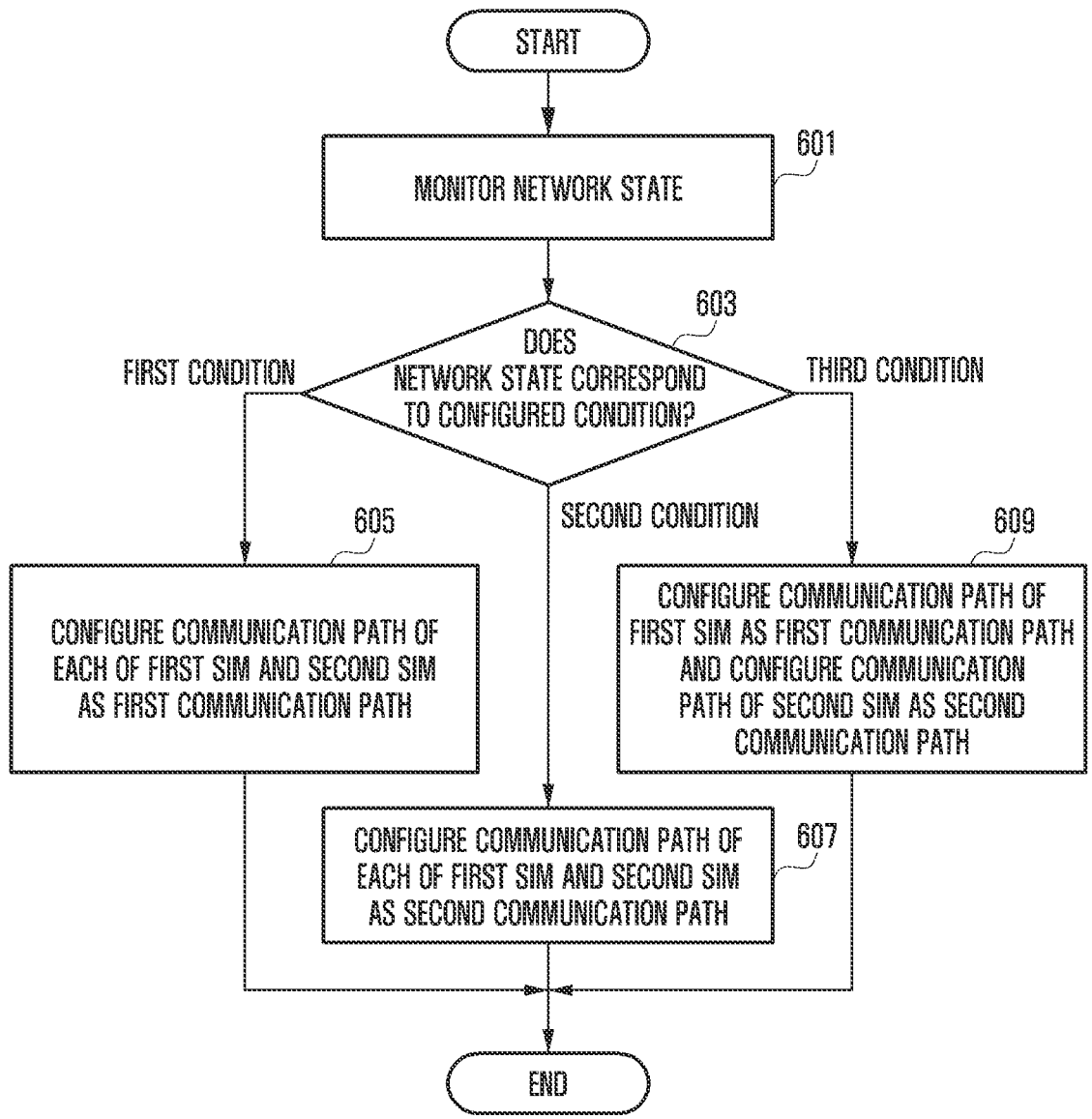
FIG. 6 is a flowchart illustrating a method for changing a dual SIM communication path, based on a configured condition according to various embodiments.

FIG. 6 is a flowchart illustrating a method for changing a dual SIM communication path, based on a configured condition according to various embodiments.

Referring to FIG. 6, in operation 601, a processor (e.g., the processor 120 of FIG. 1) of an electronic device (e.g., the electronic device 101 of FIG. 1) may monitor a network state. The processor 120 (e.g., the network monitoring module 330 of FIG. 3) may monitor a network state of a communication path corresponding to each of the first SIM and the second SIM. For example, when communication paths of both the first SIM and the second SIM are configured (or registered) as a first communication path (e.g., LTE bearer 1 221 of FIGS. 2A, 2B and/or 2C), the processor 120 may monitor a network state of the first communication path. When both communication paths of both the first SIM and the second SIM are configured as a second communication path (e.g., LTE bearer 2 223 of FIGS. 2A, 2B and/or 2C), the processor 120 may monitor a network state of the second communication path. When a communication path of the first SIM is configured as the first communication path, and a communication path of the second SIM is configured as the second communication path, processor 120 may monitor a network state of each of the first communication path and the second communication path.

In operation 603, the processor 120 (e.g., the communication path control module 320 of FIG. 3) may determine whether the network state corresponds to a configured condition. The configured condition may include at least one of a no service situation, a busy situation, or a weak electric field situation. The no service situation may mean a state in which a network is not connected and a communication service cannot be provided. The busy situation may include a case where a reception power level (Rx power level) of the electronic device 101 is equal to or less than a reference value. The weak electric field situation may include a case where a signal to noise ratio (SNR) of the electronic device 101 is equal to or less than a reference value. For example, as the location of the electronic device 101 is moved, the electronic device may enter a no service area, enter a busy area, or enter an area in which an electric field of a SIM is decreased to a level equal to or less than a predetermined level (e.g., a reference value). Alternatively, due to a problem in a communication network (e.g., an IMS network), a network situation of the electronic device may get worse. The processor 120 may perform one of operation 605 and operation 609, based on whether a currently configured communication path corresponds to the configured condition.

According to various embodiments, in operation 605, the processor 120 (e.g., the communication path control module 320 of FIG. 3) may configure a communication path of each of the first SIM and the second SIM as a first communication path. For example, a condition for configuring communication paths of both SIMs as the first communication path may be a "first condition". The first condition may be a case in which in a state where communication paths of both SIMs are configured as a second communication path, a network state of the second communication path corresponds to the configured condition. The state where the communication paths of both SIMs are configured as the second communication path may be a case where a call using the second SIM is being connected, or a network state of the first communication path is not good. Alternatively, the first condition may be a case in which in a state where the communication path of the first SIM is configured as the first communication path and the communication path of the second SIM is configured as the second communication path, a network state of the second communication path corresponds to the configured condition.

When network states of both the first communication path and the second communication path correspond to the configured condition, the processor 120 according to various embodiments may configure the communication path of each of the first SIM and the second SIM as the first communication path after a predetermined time interval. When the network states of both the first communication path and the second communication path corresponds to the configured condition, the processor 120 may determine a communication path to be configured first, based on at least one of a configuration of the electronic device, a user selection, or a network state. The processor 120 may perform operation 605 when the situations in operation 601 and operation 603 correspond to the first condition.

According to various embodiments, in operation 607, the processor 120 (e.g., the communication path control module 320 of FIG. 3) may configure a communication path of each of the first SIM and the second SIM as the second communication path. For example, a condition for configuring communication paths of both SIMs as the second communication path may be a "second condition". The second condition may be a case in which in a state where communication paths of both SIMs are configured as a first communication path, a network state of the first communication path corresponds to the configured condition. The state where the communication paths of both SIMs are configured as the first communication path may be a case where a call using the first SIM is being connected, or a network state of the second communication path is not good. Alternatively, the second condition may be a case in which in a state where the communication path of the first SIM is configured as the first communication path and the communication path of the second SIM is configured as the second communication path, a network state of the first communication path corresponds to the configured condition. When network states of both the first communication path and the second communication path correspond to the configured condition, the processor 120 according to various embodiments may configure the communication path of each of the first SIM and the second SIM as the second communication path after a predetermined time interval. The processor 120 may perform operation 607 when the situations in operation 601 and operation 603 correspond to the second condition.

According to various embodiments, in operation 609, the processor 120 (e.g., the communication path control module 320 of FIG. 3) may configure a communication path of the first SIM as the first communication path and configure a communication path of the second SIM as the second communication path. For example, a condition for configuring communication paths of both SIMs, respectively, may be a "third condition". The third condition may be a case in which network states of both the first communication path and the second communication path correspond to the configured condition. The processor 120 may configure the communication path of the first SIM as the first communication path and configure the communication path of the second SIM as the second communication path after a predetermined time interval when the network states of both the first communication path and the second communication are not good. Alternatively, the second condition may be a case in which a call connection using the first SIM ends or a call connection using the second SIM ends. The processor 120 may perform operation 609 when the situations in operation 601 and 603 correspond to the third condition.

Figure 7:
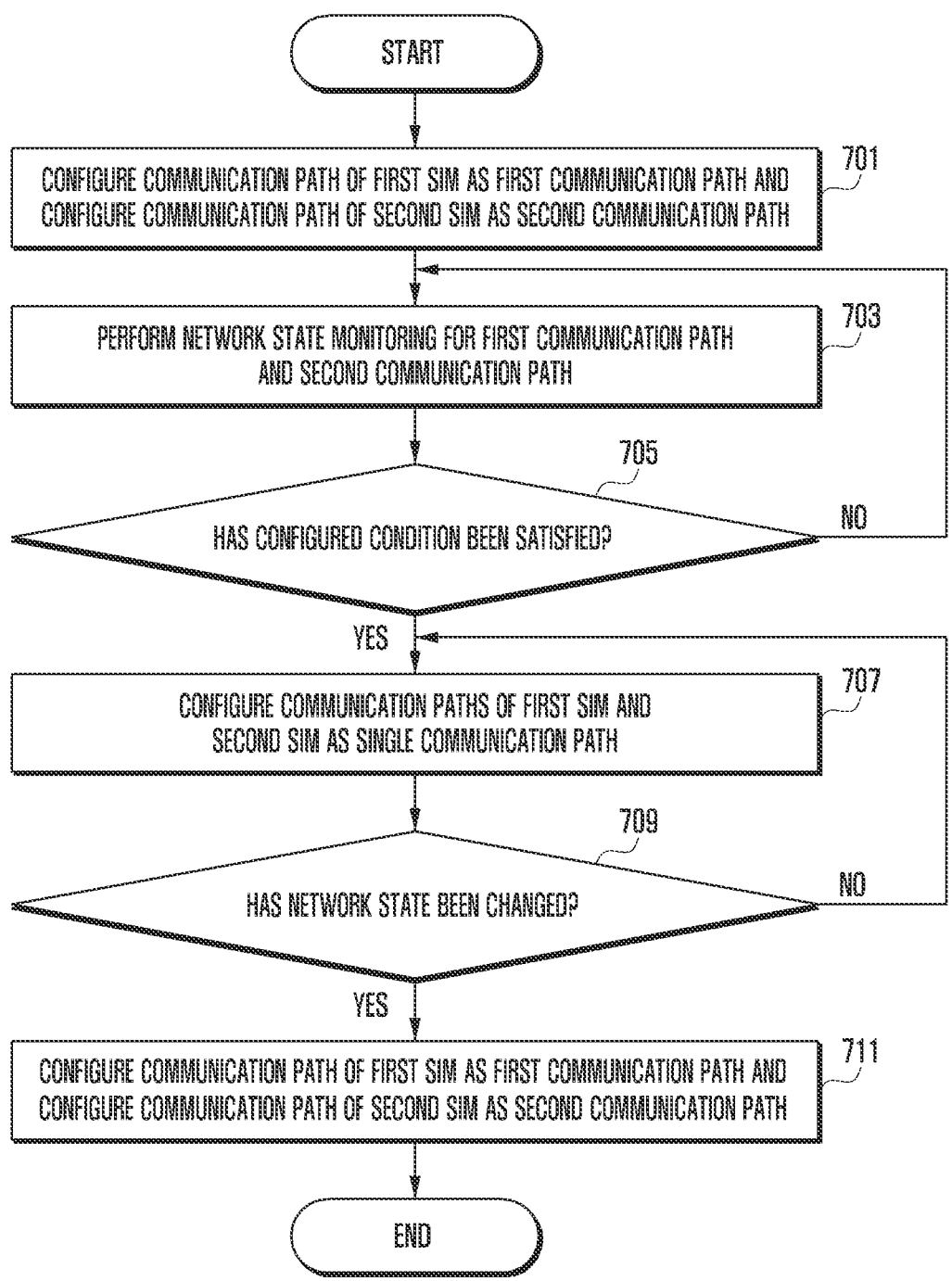
FIG. 7 is a flowchart illustrating a method for controlling a dual SIM communication path according to a network state according to various embodiments.

FIG. 7 is a flowchart illustrating a method for controlling a dual SIM communication path according to a network state according to various embodiments.

Referring to FIG. 7, in operation 701, a processor (e.g., the processor 120 of FIG. 1) (e.g., the communication path control module 320 of FIG. 3) of an electronic device (e.g., the electronic device 101 of FIG. 1) may configure a communication path of a first SIM as a first communication path (e.g., LTE bearer 1 221 of FIGS. 2A, 2B and/or 2C), and configure a communication of a second SIM as a second communication path (e.g., LTE bearer 2 223 of FIGS. 2A, 2B and/or 2C). Providers of communication services provided through the first SIM and the second SIM may be identical or different. For example, a network (e.g., LTE network 1) corresponding to the first communication path may be a first communication network provided a first carrier, and a network (e.g., LTE network 2) corresponding to the second communication path may be a second communication network provided by a second carrier.

In operation 703, the processor 120 (e.g., the network monitoring module 330 of FIG. 3) may monitor a network state of each of the first communication path and the second communication path.

In operation 705, the processor 120 (e.g., the communication path control module 320) may determine whether the network state corresponds to a configured condition. For example, if the network state of the first communication path corresponds to the configured condition, or the network state of the second communication path corresponds to the configured condition (if YES), the processor 120 may perform operation 707. When the network state corresponds to the configured condition, it may mean that the network state is not good. When the network state is not good, a seamless communication service may not be provided, or a communication quality may deteriorate. If the network state does not correspond to the configured condition (if NO), the processor 120 may return to operation 703. When the network state does not correspond to the configured condition, the processor 120 may continuously monitor the network state of each communication path.

In operation 707, the processor 120 (e.g., the communication path control module 320 of FIG. 3) may configure communication paths corresponding to the first SIM and the second SIM as a single communication path. For example, when the network state of the first communication path corresponds to the configured condition, the processor 120 may change the communication path corresponding to the first SIM to the second communication path. In this case, the communication paths corresponding to both the first SIM and the second SIM may be configured as the second communication path. Alternatively, when the network state of the second communication path corresponds to the configured condition, the processor 120 may change the communication path corresponding to the second SIM to the first communication path. In this case, the communication paths corresponding to both the first SIM and the second SIM may be configured as the first communication path.

In operation 709, the processor 120 (e.g., the communication path control module 320 of FIG. 3) may determine whether the network state changes. The communication path control module 320 may continuously receive the network state from the network monitoring module 330. When the communication paths corresponding to the first SIM and the second SIM are configured as the first communication path, the processor 120 may determine whether the network state of the second communication path changes. When the communication paths corresponding to the first SIM and the second SIM are configured as the second communication path, the processor 120 may determine whether the network state of the first communication path changes. Here, changing of the network state may mean that the network state does not correspond to the configured condition. When the network state does not correspond to the configured condition, it may mean that the network state is good. If the network state changes (if YES), the processor 120 may perform 711, and if the network state does not change (if NO), the processor may return to operation 707.

In operation 711, the processor 120 (e.g., the communication path control module 320 of FIG. 3) may configure the communication path of the first SIM as the first communication path, and configure the communication path of the second SIM as the second communication path. In a state where a network state of one communication path is not good and communication services are provided to two SIMs through another communication path, when the network state of the one communication path is changed to be good, the processor 120 may configure the original communication paths corresponding to SIMs, respectively. Operation 711 may be identical or similar to operation 701. The processor 120 may repeatedly perform operations 703 to 709 after operation 711.

An operation method of an electronic device according to various embodiments of the disclosure may include receiving a call request using a first SIM, changing a commutation path for a second SIM, and connecting the call request using the first SIM.

The method may further include configuring a communication path of the first SIM as a first communication path and configuring a communication path of the second SIM as a second communication path before the call request is received.

The changing of the communication path may include changing the communication path of the second SIM to the first communication path after the call request is received.

The method may further include changing a communication path corresponding to the second SIM, based on a confirmation of the electronic device or a user selection when the call connection using the first SIM ends.

The method may include changing of the communication path may include changing a communication path corresponding to the second SIM from the first communication path to a second communication path when the call connection using the first SIM ends.

The method may further include monitoring a network state of a communication path corresponding to each of the first SIM and the second SIM, and changing a communication path corresponding to the first SIM or the second SIM, based on a network state of the communication path.

The changing of the communication path may further include changing a communication path corresponding to the first SIM or the second SIM when the network state corresponds to a configured condition.

The configured condition may include at least one of a no service situation, a busy situation, or a weak electric field situation, and the changing of the communication path may include changing a communication path corresponding to first SIM or the second SIM when the network state of the communication corresponding to each of the first SIM and the second SIM corresponds to the configure condition.

Various embodiments of the disclosure described and shown in the specification and the drawings have presented specific examples in order to easily explain the technical contents and help understanding of the disclosure, and are not intended to limit the scope of the disclosure. Therefore, the scope of the disclosure should be construed to include, in addition to the embodiments disclosed herein, all changes or modifications derived based on the technical idea of the disclosure.

The invention claimed is:

1. An electronic device comprising:
a first subscriber identification module (SIM);
a second SIM;
a communication module;
memory storing instructions; and
a processor,
wherein the instructions, when executed by the processor, cause the electronic device to:
receive a call request using the first SIM while a communication path of the first SIM is configured as a first communication path and a communication path of the second SIM is configured as a second communication path,
change the communication path of the second SIM to the first communication path after the call request is received,
connect the call request using the first SIM by using the communication module, and
change the communication path of the second SIM, from the first communication path to the second communication path, when a call connection using the first SIM ends.

2. The electronic device of claim 1, wherein the instructions, when executed by the processor, cause the electronic device to:
monitor a network state of the communication path of the first SIM and the second SIM, and
change the communication path of the first SIM or the second SIM, based on the network state of the communication path.

3. The electronic device of claim 2, wherein the instructions, when executed by the processor, cause the electronic device to change the communication path of the first SIM or the second SIM when the network state corresponds to a configured condition.

4. The electronic device of claim 3,
wherein the configured condition comprises at least one of a no service situation, a busy situation, or a week electric field situation, and
wherein the instructions, when executed by the processor, cause the electronic device to change the communication path of the first SIM or the second SIM when the network state of the communication path of the first SIM and the second SIM corresponds to the configured condition.

5. The electronic device of claim 3, wherein the instructions, when executed by the processor, cause the electronic device to change the communication path of the first SIM and the second SIM to the second communication path when the network state of the first communication path corresponds to the configured condition while the communication path of the first SIM and the second SIM is configured as the first communication path.

6. The electronic device of claim 3, wherein the instructions, when executed by the processor, cause the electronic device to change the communication path of the first SIM and the second SIM to the first communication path when the network state of the second communication path corresponds to the configured condition while the communication path of the first SIM and the second SIM is configured as the second communication path.

7. The electronic device of claim 3, wherein the instructions, when executed by the processor, cause the electronic device to change the communication path of the first SIM to the second communication path when the network state of the first communication path corresponds to the configured condition while the communication path of the first SIM is configured as the first communication path and the communication path of the second SIM is configured as the second communication path.

8. The electronic device of claim 3, wherein the instructions, when executed by the processor, cause the electronic device to change the communication path of the second SIM to the first communication path when the network state of the second communication path corresponds to the configured condition while the communication path of the first SIM is configured as the first communication path and the communication path of the second SIM is configured as the second communication path.

9. A method of operating an electronic device comprising dual subscriber identification modules (SIMs), the method comprising:
- receiving a call request using a first SIM while a communication path of the first SIM is configured as a first communication path and a communication path of a second SIM is configured as a second communication path;
- changing the communication path of the second SIM to the first communication path after the call request is received;
- connecting a call request using the first SIM; and
- changing the communication path of the second SIM, from the first communication path to the second communication path, when a call connection using the first SIM ends.

* * * * *